United States Patent Office 3,182,814
Patented May 11, 1965

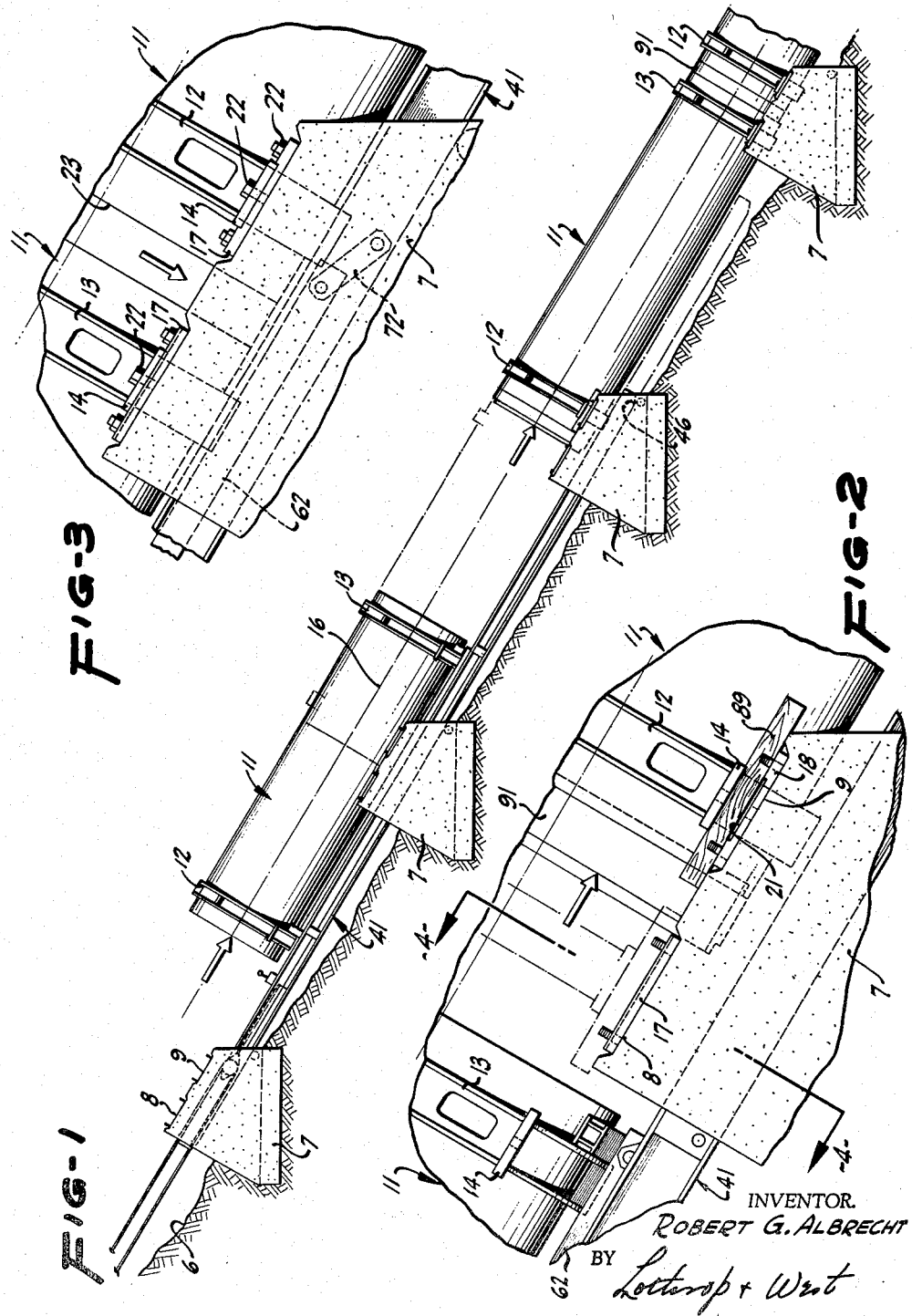

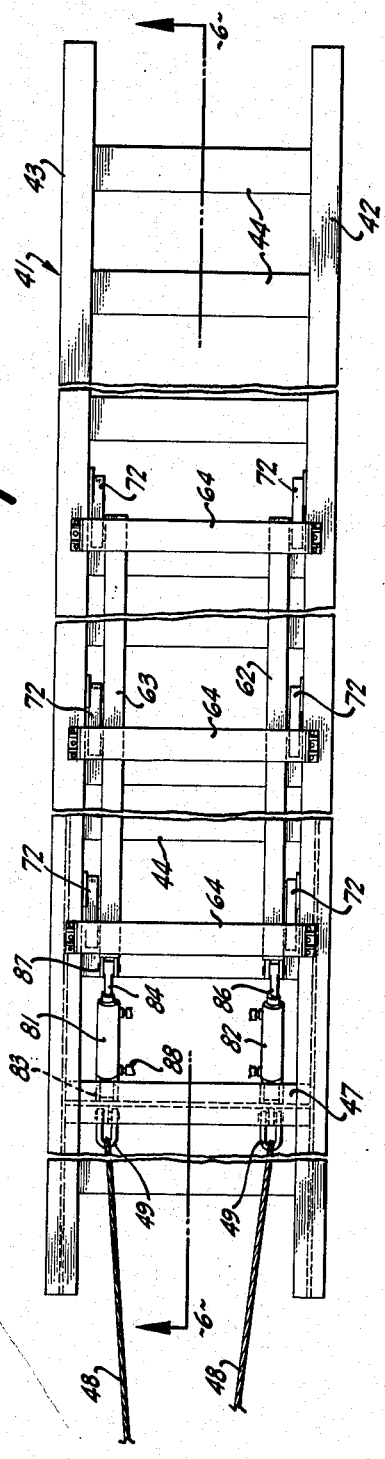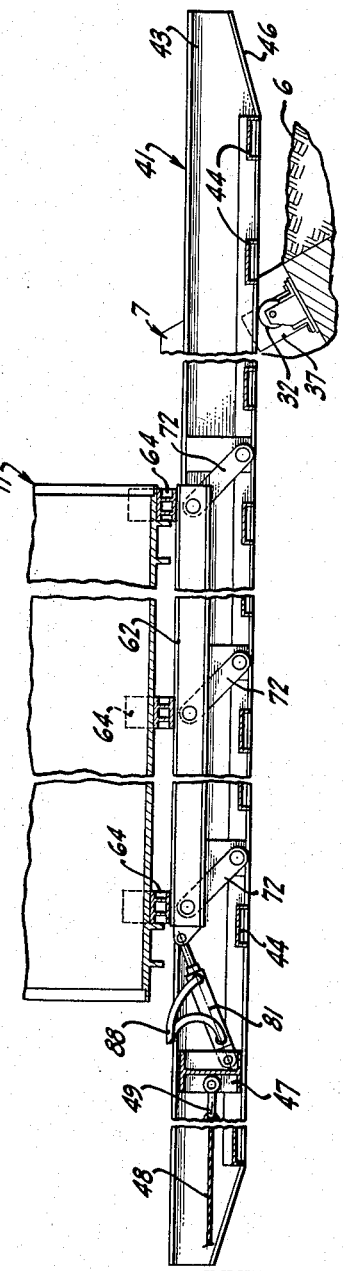

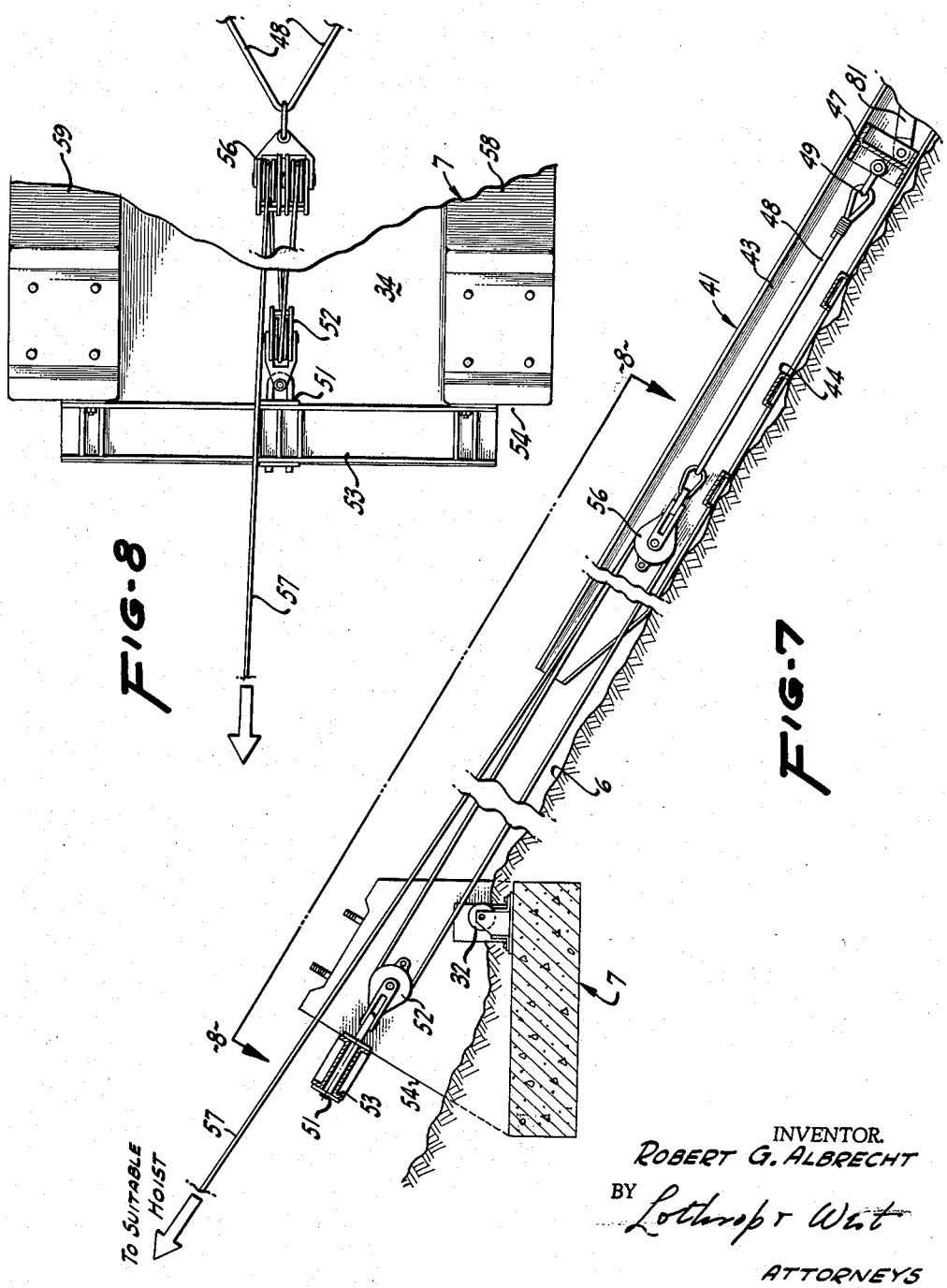

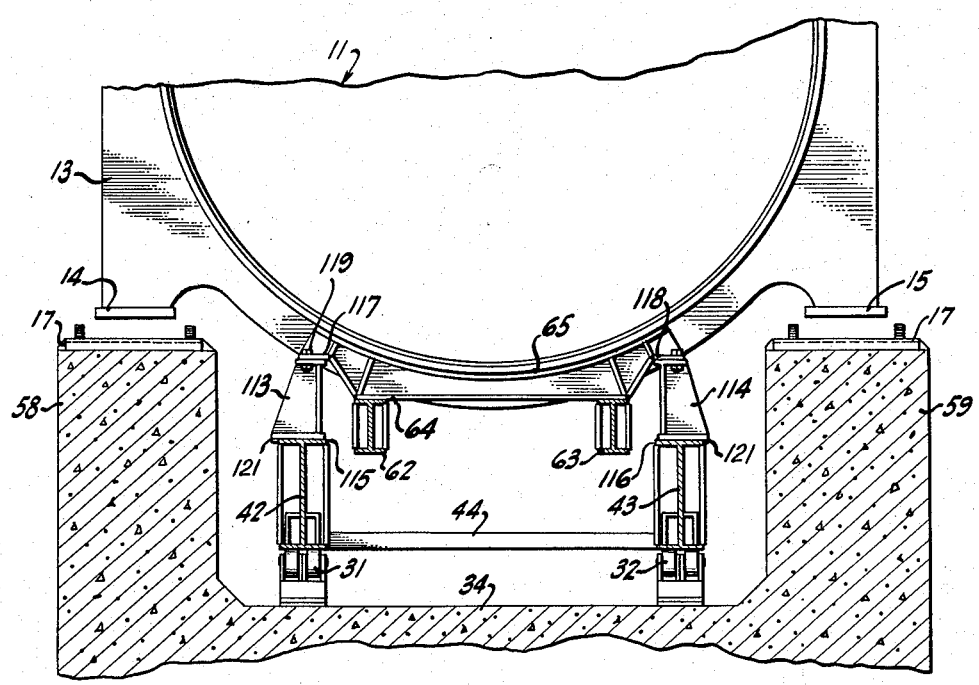

3,182,814
PENSTOCK ERECTING MACHINE
Robert G. Albrecht, Fair Oaks, Calif., assignor to
Wismer & Becker Contracting Engineers
Filed Sept. 24, 1962, Ser. No. 225,800
4 Claims. (Cl. 214—1)

My invention relates to means for putting into location and erecting into final position sections of pipe, particularly those utilized as penstock sections such as are often part of hydroelectric projects.

In many locations it is desired to conduct water from a relatively high elevation down a steep declivity to a lower location for use and discharge, the conducted water being confined within pipe or penstock sections. These individual sections are often installed at a steep incline to the horizontal and are supported at both ends on some sort of anchoring devices. As the size (for example, eleven feet in diameter) and weight (for example, fifty-one tons) of these penstock sections have increased over the years, and particularly since the terrain in which they are erected is usually quite rugged, steep (for example, fifty-six percent grade) and sometimes virtually inaccessible, the job of finally locating and accurately positioning the penstock sections for fastening is awkward, expensive and difficult.

It is therefore an object of my invention to provide a penstock erecting machine which can be utilized in the relatively rough territory usually encountered and which will serve with very little supervision and manpower for jockeying penstock sections into position and finally locating them with considerable accuracy despite the pitch, length, diameter and weight of the sections.

Another object of the invention is to provide a penstock erecting machine which is relatively simple in construction and operation so that it can be easily transported to and used in relatively remote and difficult locations.

A still further object of the invention is to provide a penstock erecting machine which can be utilized repeatedly in different plans for erecting penstock sections despite variations in the slope or contour from place to place.

Another object of the invention is to provide a penstock erecting machine which can be utilized with penstock sections of the sort normally encountered.

A still further object of the invention is to provide a penstock erecting machine which affords improved safety in the operation of erecting penstock sections.

Another object of the invention is in general to improve the facilities for erecting penstock sections.

Other objects together with the foregoing are attained in the embodiment of the invention described in the accompanying description and illustrated in the accompanying drawings, in which:

FIGURE 1 is a side elevation of a hillside having suitable facilities for the erection of penstock sections thereon and with the machine of the invention in position for erecting a penstock section.

FIGURE 2 is an enlarged detail showing a portion of the adjacent ends of penstock sections.

FIGURE 3 is a view similar to FIGURE 2 but showing a subsequent stage in the positioning of the penstock sections.

FIGURE 5 is a plan of a penstock erecting machine pursuant to the invention, portions being broken away to reduce the length of the figure.

FIGURE 6 is a view comparable to FIGURE 5 but showing the structure in cross section, the plane of which is indicated by the line 6—6 of FIGURE 5.

FIGURE 7 is an enlarged detail of part of a hoist mechanism utilized in connection with the erecting machine, portions being broken away to reduce the figure size.

FIGURE 8 is a partial plan, portions being broken away, of the structure shown in FIGURE 7, the view being taken along the lines 8—8 of FIGURE 7.

FIGURE 9 is a view comparable to FIGURE 1 but showing a different contour of penstock section with the penstock erecting machine adapted for such use.

FIGURE 10 is a view comparable to FIGURE 4 but showing the penstock erecting machine adapted for use in the environment illustrated in FIGURE 9.

FIGURE 11 is a side elevation of a portion of the spacer blocks utilized in the environment of FIGURES 9 and 10.

Figure 4:
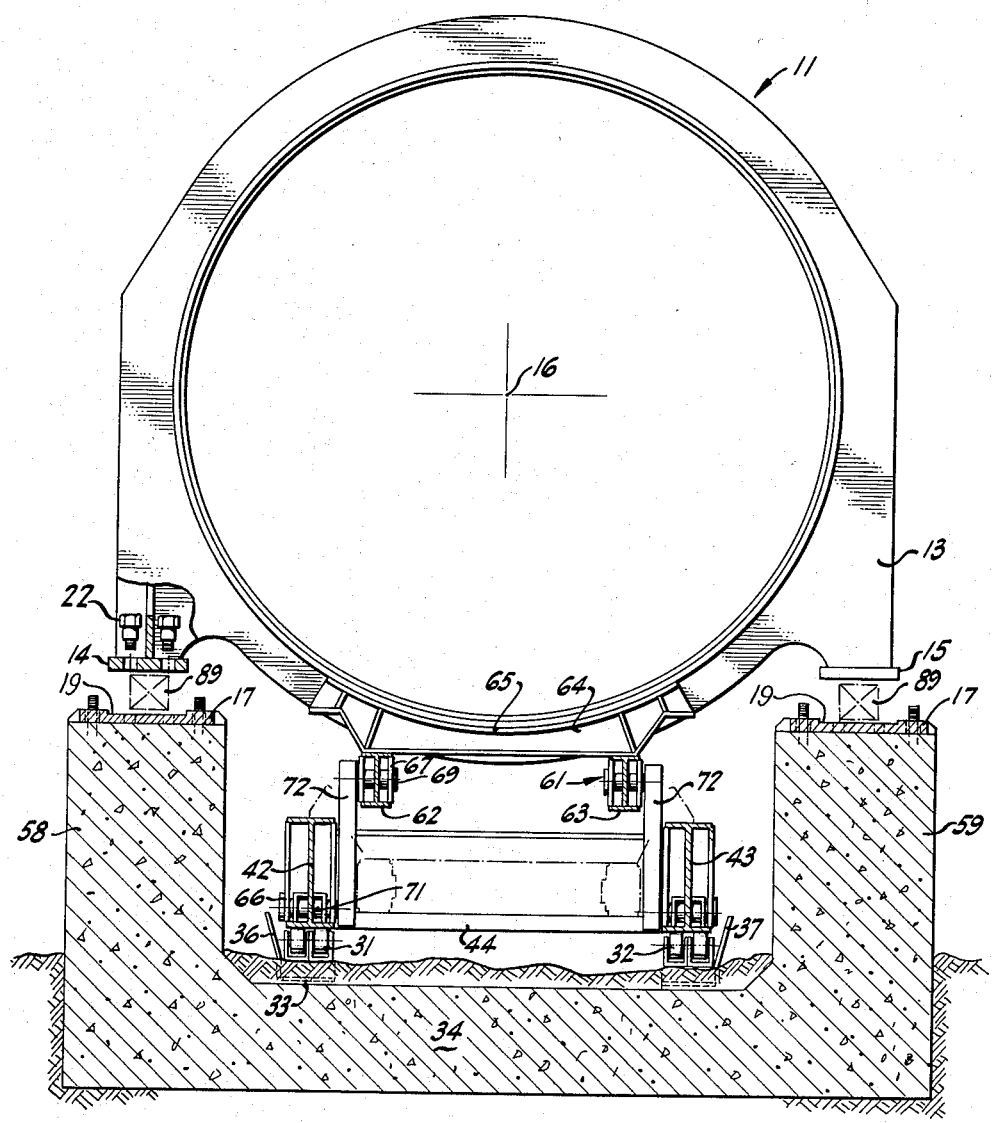
FIGURE 4 is a transverse cross section on a vertical plane through a penstock section and the penstock erecting machine of the invention with the penstock section partially in position.

While the penstock erecting machine pursuant to the invention can be embodied in a number of different ways and can be particulary adapted for use in special environments and with special penstock sections, it has successfully been utilized in practice as disclosed herein. In this environment the penstock sections are installed on a hillside 6 of considerable slope. Arranged at appropriate intervals is a series of substantially identical anchor blocks 7. The anchor blocks themselves are usually reinforced concrete structures roughly U-shaped and suitably positioned in the ground. They are positioned in line and terminate at their upper ends on opposite sides of the center line of the ultimately installed penstock. Each block at its upper ends carries a number of supporting pads 8 and 9.

Each penstock section 11 (with a later noted exception) is a generally circular cylindrical length of pipe; for example, pipe fabricated of steel plate curved and welded. Surrounding each pipe length at appropriate locations near the ends are arch collars 12 and 13 incorporating (FIGURE 4) supporting pads 14 and 15 at opposite sides of the center line 16. The pads 14 and 15 are designed to be received in the anchor plates 17 and 18. The anchor plates 17 on opposite sides of the pipe are provided with a longitudinal groove 19 so that the adjacent portion of the penstock section may move somewhat in an axial direction therein but is constrained against movement laterally or transversely. The anchor plates 18 are arranged with a transverse groove 21 therein so that the adjacent portion of the penstock section is permitted some transverse or lateral motion but is constrained against any axial movement. The penstock section is secured to the anchor plates and to the blocks by appropriate stud or bolt and nut fastenings generally indicated as 22 in FIGURES 3 and 4. The individual penstock sections, although arranged in axial alignment serially one after the other, are not tightly abutted, but rather are spaced apart. The hydraulic continuity is established or preserved by the installation around successive sections of a circumscribing band 23 (FIGURE 3) of a generally flexible nature. The individual penstock sections can expand and contract slightly or can partake of other minor movements relative to each other without impairing the watertight integrity of the penstock system and without inducing excessive strains in the pipe sections themselves or in their fastenings or mountings.

For use in this particular environment and adapted to cooperate with the erecting machine of the invention the anchor blocks 7 are each provided initially with a pair of roller sets 31 and 32 having individual mounts 33 on the concrete cross member 34. The rollers are arranged in transverse alignment and coaxially. The roller sets are preferably provided with side guard plates 36 and 37 extending upwardly above the rollers themselves. Preferably the roller sets 31 and 32 are located in the forward or downhill portion of the cross member 34 so that they are adjacent the downhill edge of the individual anchor blocks and thus are approximately at the finished contour of the ground or slope 6.

Designed to operate on the roller sets 31 and 32 is a carrier having a base frame 41. This is primarily a structural framework generally rectangular in plan and includes a pair of side rails 42 and 43 approximately connected together by a number of cross members 44. The side rails are long enough to engage the rollers on at least two anchor blocks. At their ends the side rails are cut to afford bevel surfaces 46. At the rearward end the base frame has a cross member 47 to which a hoist line 48 is attached by suitable linkage 49.

A swivel 51 for the upper block 52 of a block and tackle mechanism is supported in a cross beam 53 held temporarily against the uphill face 54 of an anchor block. Included in the block and tackle arrangement is a lower block 56 to which the line 48 is secured and from which a line 57 extends to any suitable power hoist. When the line 57 is taken in and the blocks 52 and 56 are moved toward each other, then the base frame is moved up the slope 6. When the line 57 is paid out, the block 56 moves downhill from the block 52 and the base frame moves down the slope by gravity, the weight of the base frame and anything carried by it being borne by the roller sets 31 and 32 in the successive anchor blocks 7. The successive roller sets are readily engaged by the beveled leading corners 46 of the base frame. In this fashion the base frame is moved up and down the series of anchor blocks centrally between the side pillars 58 and 59 thereof and above the cross members 34, being constrained, if necessary, by the guard plates 36 and 37.

Adapted to cooperate with the base frame is a pipe frame 61 including a pair of side rails 62 and 63 connected at appropriate intervals by members 64 which not only serve as cross ties, but also are formed to provide arcuate saddles 65. The contour of the saddles is appropriate to interfit with any one of the penstock sections 11.

Pursuant to the invention, both of the side beams 62 and 63 as well as the side rails 42 and 43 are provided at appropriate evenly spaced intervals with suitable bearing bushings 66 and 67 arranged with mirror symmetry about the central vertical plane.

Journalled in the various bearings so formed are the crank pins 69 and 71 of side links 72 or cranks. These are all of the same dimension between their individual rotational axes so that there is afforded a parallel link support of the pipe frame on the base frame. With this interconnection, the pipe frame can be raised and lowered always parallel to itself and in an arcuate path with respect to the base frame as constrained by the parallel link motion.

A hydraulic jack mechanism including a pair of parallel, interconnected jack cylinders 81 and 82 provides the desired motion between the two frames, as particularly shown in FIGURES 5 and 6. At one end these are journalled by pivot mountings 83 to a suitable cross member such as 47 (FIGURE 7) of the base frame. At the other end the respective piston rods 84 and 86 are joined by pivot connections 87 to one of the cross members, such as 64, at the uphill end of the pipe frame. The hydraulic connections 88 extend from the cylinders to any suitable source of controlled hydraulic power. When the uphill ends of the cylinders are subject to hydraulic pressure, the pistons 84 and 86 are projected and the pipe frame is moved forwardly and upwardly parallel to itself and in an arcuate path with respect to the base frame. When the hydraulic pressure conditions are reversed, then the pipe frame is moved rearwardly and downwardly with respect to the base frame.

In the use of this mechanism, the line 57 is taken in to cause the block 56 to approach the block 52 and hydraulic pressure is exerted on the downhill end of the cylinders 81 and 82 so that the pipe frame is lowered with respect to the base frame, usually to the extent that the side bars 62 and 63 rest on the cross members 44. In an appropriate uphill location a section 11 of penstock is lowered by any suitable means onto the saddles 65 of the pipe frame and with the penstock collars 12 and 13 engaged adjacent to and on the uphill side of adjacent cross members 64 of the pipe frame. The base frame and pipe frame extend downhill beyond the penstock section.

The line 57 is paid out at a controlled rate so that the block 56 moves downhill and the base frame correspondingly moves downhill on the various roller sets 31 and 32. When as shown in FIGURE 1 the penstock section being lowered approaches the upper end of an already positioned penstock end, the cable 57 is stopped at an appropriate location with the penstock ends nearly in abutment. The forward portion of the base frame and pipe frame then underlies the uppermost, previously positioned penstock section. When this has been accomplished, the hydraulic pressure is directed into the hydraulic cylinders 81 and 82 so as to lift and advance the pipe frame relative to the base frame, thus lifting the penstock section.

At this time the uphill end of the previously positioned penstock section has not yet been finally seated on the anchor block pad 9. Rather, it is still held temporarily above the pad by previously interposed wooden blocks 89.

Under these conditions the penstock section being positioned is carefully moved, by cable and hydraulic operation, into proper axial alignment with the preceding section. A flexible sealing band 91 is placed around the adjacent but slightly spaced penstock ends. Then the pipe frame is raised slightly to lift both penstock sections so that the temporary blocks can be removed. Then the pipe frame is lowered sufficiently so that the penstock sections are gently lowered, the uphill end of the new section coming down onto temporary wooden blocks at its upper end on the subjacent anchor blocks. Following this, the pipe frame is completely lowered by release of the hydraulic pressure fluid from the jacks 81 and 82 so that the height of the mechanism is then low enough to pass beneath all of the positioned penstock sections including the flanges of the collars 12 and 13. The cable 57 is taken in, thus drawing the entire mechanism uphill for repetition of the cycle.

If it is not sufficiently far uphill to serve several more cycles, the cross beam 53 is detached and reinstalled at a farther uphill station. The process is repeated indefinitely with successive sections of penstock until the entire assembly has been made. After the temporary blocks 89 have been removed and the penstock sections have been appropriately lowered, they are finally secured in place by suitable fastenings. The roller sets 31 and 32 can be used on other jobs or on the same job at a higher elevation or can be left in place for subsequent maintenance or service work.

The foregoing operation is appropriate as long as the inclination of the axis of the penstock does not vary very much. Often there is an abrupt change in inclination near the lower end of the line where the inclined penstock joins a horizontal section 101 as shown in FIGURE 9. At this location a special anchor block 102 is provided. This has an incline section 103 very much as before and is provided with roller sets 104 comparable to the roller sets 31 and 32. However, the anchor block also has an approximately horizontal portion 106 to which an elbow end 107 of the penstock section 101 is fastened by a collar 108. The problem is to lower a penstock section 109 identical with the penstock sections 11 into position for connection to the elbow 107 by means of a flexible band 111, as before. The difficulty is that the downhill end of the base frame cannot be slid downwardly to as great an extent as before because of the contour of the terrain. For that reason the mechanism is modified and a different technique is employed.

As shown in FIGURE 10, the pipe frame is elevated with respect to the base frame and spacer sections 113 and 114 are introduced between the top flanges 115 and 116 of the side beams and special feet 117 and 118 forming part of the cross member 64. The extensions 113 and 114 are bolted in place by temporary fastenings 119. Each of the spacers 113 and 114 has a downturned edge flange 121 adapted to run against the side edges of the top flanges 115 and 116. The crank links 72 are all disconnected or removed by removal of appropriate pins. The hydraulic jacks are disconnected.

The penstock section 109 is seated on the saddles 65 of the cross members 64 as before and at an uphill location. It is supported on the extensions 113 and 114. The base frame is lodged against part of the anchor 102 and is held in position. The connection 49 having been disconnected from the base frame cross member and being temporarily attached to the uppermost cross member 64 of the pipe frame, when the line 57 is paid out, the upper pipe frame slides downhill on the stationary base frame. The flanged spacers 113 and 114 serve as runners and guides. The penstock section 109 is thus moved downwardly into an appropriate location with respect to the elbow 107.

What is claimed is:

1. A penstock erecting machine for use with a series of anchor blocks having rollers thereon comprising:
    (a) an elongated base frame including a pair of spaced parallel side rails adapted to engage said rollers;
    (b) an elongated pipe frame including a pair of parallel side bars spaced apart to be disposed between said side rails;
    (c) a parallel link mechanism supporting said pipe frame for movement between a lower position between said side rails and an upper position above said side rails, said parallel link mechanism including a plurality of links detachably journaled at one end on said side rails and at the other end on said side bars;
    (d) a plurality of pipe cradles mounted on said side bars, said pipe cradles each including a pair of laterally extending feet portion adapted to overlie and be supported by said side rails in detached condition of said links; and
    (e) means selectively engageable either with said base frame or with said pipe frame for selectively advancing said frames in a longitudinal direction, said advancing means being effective to advance both of said frames concurrently with the movement of said parallel link mechanism in connected condition of said links, and being effective to advance said pipe frame relative to said base frame in detached condition of said links.

2. The device of claim 1 further characterized by means connected to said feet portion and engageable with the longitudinal sides of said side rails for guiding said pipe frame relative to said base frame.

3. The device of claim 1 wherein said frame advancing means includes a block and tackle mechanism secured at one end to a cross beam detachably mounted on an anchor block remote from said frames.

4. A machine for erecting a penstock on a series of anchor blocks said machine comprising:
    (a) a plurality of pairs of longitudinally aligned rollers mounted on the anchor blocks;
    (b) an elongated base frame including side rails engageable with and movable on said rollers, said base frame having a length sufficient to span at least two of said roller pairs;
    (c) an elongated pipe frame;
    (d) a parallel link mechanism supporting said pipe frame for movement between a lower position between said side rails and an upper position above said side rails;
    (e) a jack engaging said base frame and said pipe frame for moving said pipe frame between said positions;
    (f) cradle means on said pipe frame for engaging a penstock section for movement with said pipe frame; and,
    (g) means for moving said base frame in a longitudinal direction on said rollers.

References Cited by the Examiner

UNITED STATES PATENTS

| | | | |
|---|---|---|---|
| 1,253,925 | 1/18 | Boss | 214—38.46 |
| 1,809,540 | 6/31 | Young | 214—38.40 |
| 2,857,922 | 10/58 | Effinger. | |
| 2,920,773 | 1/60 | Knabe | 214—340 X |
| 2,922,533 | 1/60 | La Barge. | |
| 2,959,311 | 11/60 | Rosenow | 214—512 |
| 3,048,280 | 8/62 | Huff et al. | |

FOREIGN PATENTS 229,467  11/59  Australia.

HUGO O. SCHULZ, *Primary Examiner.*

GERALD M. FORLENZA, *Examiner.*